United States Patent [19]
Nogay et al.

[11] Patent Number: 5,993,088
[45] Date of Patent: Nov. 30, 1999

[54] METHOD FOR IMPROVING PRINT PERFORMANCE AND QUALITY BY ACCUMULATING, STORING AND USING RESOURCE ACCOUNTING INFORMATION WITH A PRINT JOB

[75] Inventors: Patrick Edward Nogay; Lee Martin Tartak; Mark Wayne VanderWiele, all of Austin, Tex.

[73] Assignee: International Business Machines Corporation, Armonk, N.Y.

[21] Appl. No.: 09/164,125

[22] Filed: Sep. 30, 1998

[51] Int. Cl.[6] ........................................................ B41J 3/44
[52] U.S. Cl. ................................ 400/78; 400/61; 400/63; 400/76
[58] Field of Search .................................. 400/61, 63, 76, 400/78; 358/468; 395/118, 805

[56] References Cited

U.S. PATENT DOCUMENTS

| | | |
|---|---|---|
| 5,044,790 | 9/1991 | Kawamura ................................. 400/76 |
| 5,313,565 | 5/1994 | Mori .......................................... 395/118 |
| 5,505,549 | 4/1996 | Ishiguro ...................................... 400/61 |
| 5,575,573 | 11/1996 | Ito et al. ..................................... 400/76 |
| 5,708,844 | 1/1998 | Masu et al. ............................... 395/805 |
| 5,732,197 | 3/1998 | Nakagiri .................................... 395/110 |

*Primary Examiner*—Edgar Burr
*Assistant Examiner*—Charles H. Nolan, Jr.
*Attorney, Agent, or Firm*—Jeffrey S. LaBaw

[57] ABSTRACT

The invention provide a method for optimal use of print resource during the preparation a print job for printing. During the creation of a spool file, or similar intermediate file, the invention logs data on print resource usage in a print job in an accounting file. Upon review of this data, it modifies the print resource usage data in the accounting file as necessary to optimize print resource usage. The spool file and the accounting file are then sent to a printer driver. The printer driver knows how to use the print resource data in the accounting file to optimize the print resource usage.

20 Claims, 8 Drawing Sheets

Page 1

FontA
  xxxx

SaveState
FontB
  xx
Restore State

FontC
  xxx

FontC
  xxxx

FontC
  xx

FontB
  xxx

FontA
  xxxx

Page 2

FontA
  xxxx

FontD
  xxxxx

FontA
  xxx

FontA
  xxxxx

Page 3

FontE
  x

FontA
  xxxx

FontA
  xxx

FIG. 7

METHOD FOR IMPROVING PRINT PERFORMANCE AND QUALITY BY ACCUMULATING, STORING AND USING RESOURCE ACCOUNTING INFORMATION WITH A PRINT JOB

BACKGROUND OF THE INVENTION

The present invention relates to the field of information handling systems. More particularly, it relates to a system and method for improving performance and quality of printed documents by accumulating, storing and using resource accounting information with a print job.

It is well known to provide the output from a computer system in a printed form. A peripheral device, a printer, is coupled to the computing system by means of hardware such as printer adapter cards and cabling. Since a printer can often be efficiently shared between two or more computing systems, it is known to have a single machine in the network, a printer server, dedicated to providing the interface between the printer and the other machines in the network. Further, it is also known to have software modules such as graphics drivers and printer drivers to insulate the typical applications running in the computer systems from the need to know the peculiarities and details of printing via a particular printer attached to the network.

The printing subsystem, including the graphics and printer drivers, receives graphics calls from the applications and translates those into a print job. During the creation of a print job, an application may use a variety of resources such as fonts, color palettes, patterns and other printer resources. These printer resources are often not handled optimally by the print subsystem, because the print system does not know when and how often these resources will be used. More specifically, since the printer driver which is creating the data stream for the printer does not know when or how often fonts are used, the printer driver may download a font multiple times or unnecessarily download a font when only a few characters are used.

Under some printer memory management systems, a downloaded font must be sent to the printer between pages so it can be locked in the job memory and used on other pages. Since the print system does not know in advance the fonts which are used within a page, the font must be downloaded twice, once when the font is used and again between pages for subsequent uses. Thus, these management systems increase the amount of data sent to the printer and slow the print process. Similarly, since the print system does not know what color palettes may be used during a print job, it can not correctly set up its hardware palette to represent the colors most frequently used in the document. Usually, this causes the printed colors to be changed or remapped when printing to the device.

In today's information handling systems, a typical print subsystem performs the spooling and creation of a printer specific data stream on behalf of the application submitting the print request. Usually, the printing process is divided into two parts, spooling or queuing of the print data and de-spooling or sending the data to the device. The actual creation of the printer specific data stream can be done during the spooling phase, or in some configurations, i.e. when a metafile is used as a spool file, the printer specific data stream can be created during the de-spooling phase. Depending on the system configuration, the network connectivity and the server functionality, both phases of the print process may be done on a single system or the first phase may be done on a client system and the second phase may be done on a server system.

A typical print system consists of the following components or combinations of the following components to produce similar functionality. Referring to FIG. 1, in a distributed environment, a client machine 11 will typically request printing services from a print server 13 via a network 15, the print server 13 being coupled to one or more printers 17. The process begins when an application 19 produces a print job by making a series of graphics calls according to a graphic API. The graphics engine 21 is the component which is responsible for mapping or converting the application interfaces or graphics API calls to the printer driver interfaces. The printer drivers 23 and 35 are the components which are responsible for creating the printer specific data that is sent to the printer 17 to produce the desired output. In many instances, this component 23 provides configurable settings and returns information about the device 17. In some systems, the printer drivers 23 and 35 are called formatters since they format the data appropriately for the printer. In other systems, this component 23 is called a transform since it transforms the operating system calls or input stream to the data stream appropriate for the printer 17.

The spooler 25, 27 is the component which stores and retrieves the print job 29 using a queuing process to coordinate access to the printer 17. The queue driver 31 is sometimes used in print systems to preform at the spool data before sending the data to the printer driver 35 installed for the device. In most cases, this component 31 is handling the case where a metafile has been spooled and the metafile must be played back to the underlying print components by calling operating system components. The operating system components parse the metafile and convert the metafile back to graphics calls that can be passed the graphics engine 33. In other systems, where printer specific data has been spooled, the queue driver 31 simply passes the raw data to the underlying components of the print system. The graphics engine 33 at the server is responsible for mapping or converting the application interfaces or graphics API calls to the printer driver 35 interfaces. The printer driver 35 at the server is responsible for creating the printer specific data which is sent to the printer to produce the desired output.

The port driver 37 is a component in some printing systems which separates the logic of how to communicate or send data to a physical device driver 39. In these systems, the port driver 37 is responsible for handling the device driver interface to the printer. The physical device driver 39 is the component which is responsible for the hardware protocols used to communicate with or transmit data to the printer 17.

One prior art solution for managing font resources downloaded to a printer is to delete fonts on a least recently used basis when the maximum number of fonts have been downloaded. This method is inefficient because it disregards when and how often a font may be used again and may download a font that has minimum usage. Another prior art method for managing printing resources is to simply stop downloading resources when the maximum number of resources that can be downloaded to the printer is reached. This method does not account for fonts that may have large amounts of usage at the end of the document.

Other prior art systems have used font downloaders which are independent programs. These stand alone downloaders send all the fonts down before the beginning of a series of jobs. These fonts can take up memory from the print jobs, since they are resident in memory even if the font is not used. Some other prior art systems download fonts twice to get the font in global memory hoping the font will be used again. This method may waste printer memory and certainly takes additional time.

The present invention provides an improved method for handling printer resources.

SUMMARY OF THE INVENTION

The invention provide a method for optimal use of print resources during the preparation a print job for printing.

During the creation of a spool file, or similar intermediate file, the invention logs data on print resource usage in a print job in an accounting file, which may be an in memory structure or a physical file. Upon review of this data, it modifies the print resource usage data in the accounting file as necessary to optimize print resource usage. The spool file and the accounting file are then sent to a printer driver. The printer driver knows how to use the print resource data in the accounting file to optimize the print resource usage. The optimization process could occur entirely at the creation of the spool file and accounting file, or entirely at the printer driver upon receipt of the accounting information or a combination of the two.

The invention is fully automatic requiring no user intervention. This solution is beneficial for a printer system that is managing many applications and print jobs. Using the invention, the printer system can be tuned to make the best use of memory and print resources. For example, in situations where the printer has low memory, only the most frequently used print resources will be downloaded. By accumulating information about print resources used in a print job during the spooling phase of the job and storing this information with the job, the printer driver or print subsystem can use this information to more optimally handle these print resources when creating the data stream for the print job sent to the printer.

BRIEF DESCRIPTION OF THE DRAWINGS

FIG. 7 shows a document with print resource usage to be optimized by the present invention.

DETAILED DESCRIPTION OF THE DRAWINGS

In a spooling print system, an intermediate file or metafile is created when the application issues drawing or text commands. This file contains graphics orders, not the actual printer language. The present invention derives the information on how the fonts or other print resources are used from the graphics calls issued by the application submitting the print job. Preferably, this information is compiled during the creation of the intermediate file. This information is stored in a separate area to preserve the integrity of the intermediate file so it does not create print system incompatibilities.

When the print system plays the intermediate file to the printer driver, the stored accounting information is presented at the job start. This allows the printer driver to optimally send the fonts or other resources to the printer when they are needed. For example, if a font is used only on one page, it is sent within the page. Multipage fonts are sent right before the page on which they are used for the first time and are not downloaded multiple times since they are now part of the job memory. When the maximum number of fonts have been downloaded, fonts that have no or minimum usage in the remainder of the document are deleted from the printer first. Also, since the actual usage of the font in the document is known, unnecessary or inefficient downloading of fonts can be avoided. For example, when the font download information exceeds the size of other techniques for rendering the characters on the printer, such as stroking the characters or sending the bit maps of the characters, a font download is not used.

When a metafile is not used as the spool file format, an alternate method is used to buffer page data to accumulate accounting information and insert resource management at the beginning of each page. In this alternative embodiment, when a raw print job is specified, the printer driver will buffer up the print job before sending it to the printer (direct) or spool subsystem (queued). As the print job is buffered, the driver will place markers where it would have inserted the downloaded resource in the printer data stream. The location of the markers are kept in a table for quick access. When the end of print job is reached, the markers are adjusted as described in the standard metafile description. The buffer(s) is now sent to its intended destination. When a resource marker is encountered, the actual print resource is now sent to the printer and marker removed.

Figure 2:
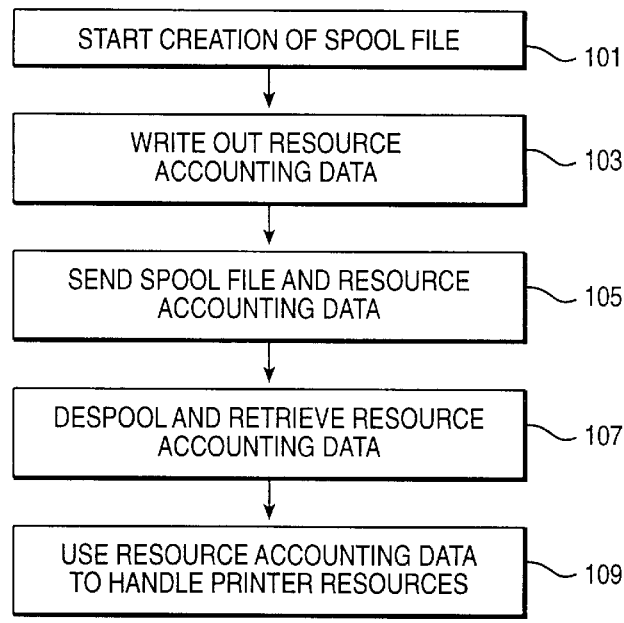
FIG. 2 shows a general flow diagram of the present invention.

In FIG. 2, a flow diagram of the general process is depicted. In step 101, the method shows the creation of the spool file. During the creation of the spool file, which in many print systems is an intermediate file or metafile, the printer driver accumulates information about the resources used in the print job and stores the information in a set of data structures. The FONTRESOURCEBLOCK data structure described below is one implementation of a set of data structures which can be used to hold the resource accounting information.

In step 103, at the end of the spooling of the intermediate file, the printer driver calls the spooler component to write out the resource accounting information in addition to the spool file. One illustrative example of a spooler API used to store the job resource accounting information is the SplSet-Job API described below. In the case of a client server network, in step 105, the spool file and the resource accounting file are sent to the printer server for printing via the network. In the case of local printing, the spool file and resource accounting file are passed to the second phase of the print process.

In step 107, the spooler uses the intermediate spool file to begin the second phase of the print process, typically called the despooling phase. In addition to despooling, the spooler retrieves the resource accounting information and passes the information to the printer driver or other interested components of the print system. In step 109, during the creation of the printer specific data stream, the printer driver uses the job accounting information to drive methods developed by the present invention that more intelligently handle the printer resources. That is, as described above, the printer driver downloads the most frequently used fonts and colors, prevents their removal from the print job memory and uses the most efficient way of producing less frequently used fonts.

Figure 1:
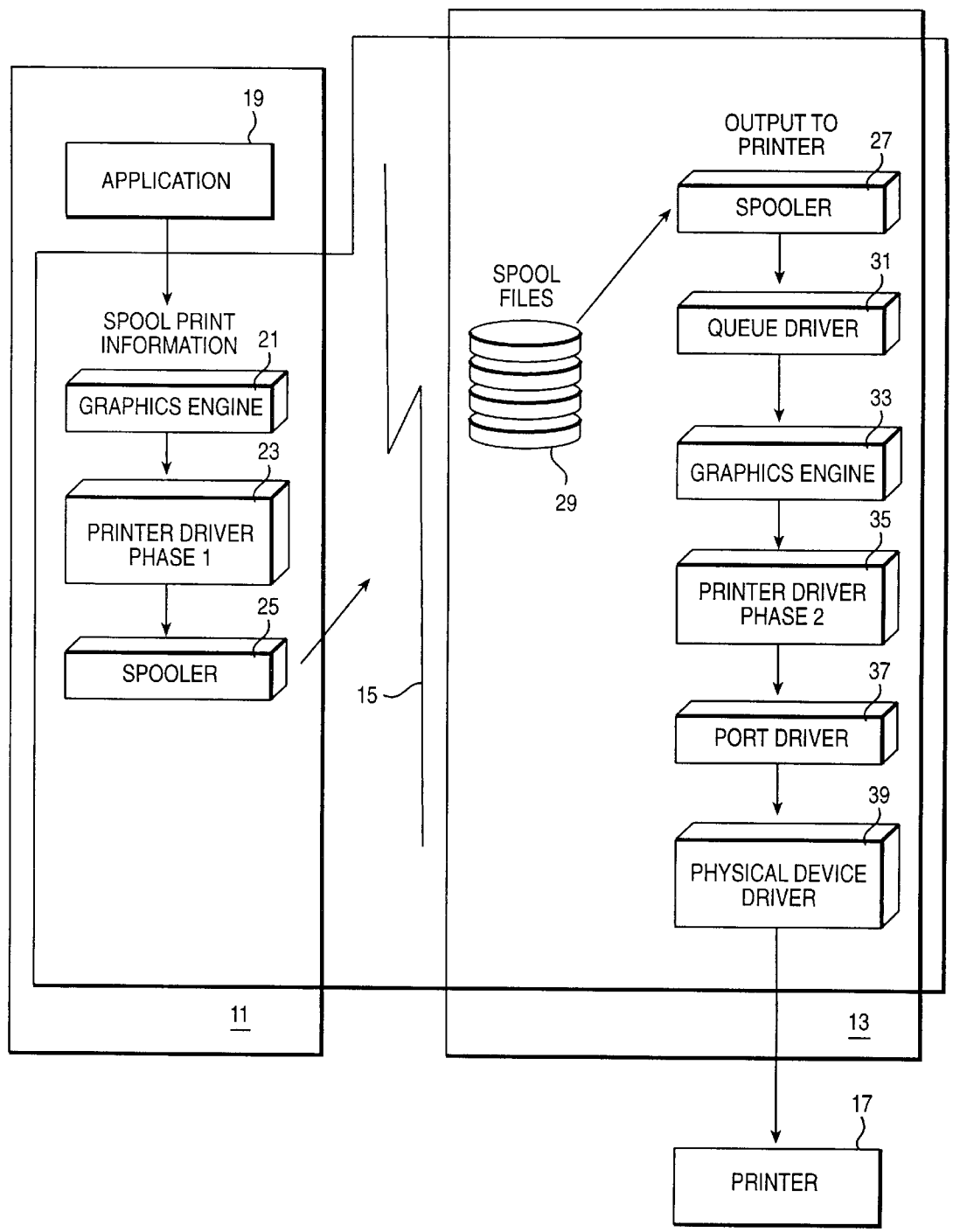
FIG. 1 depicts a typical prior art distributed printing system.
Figure 3:
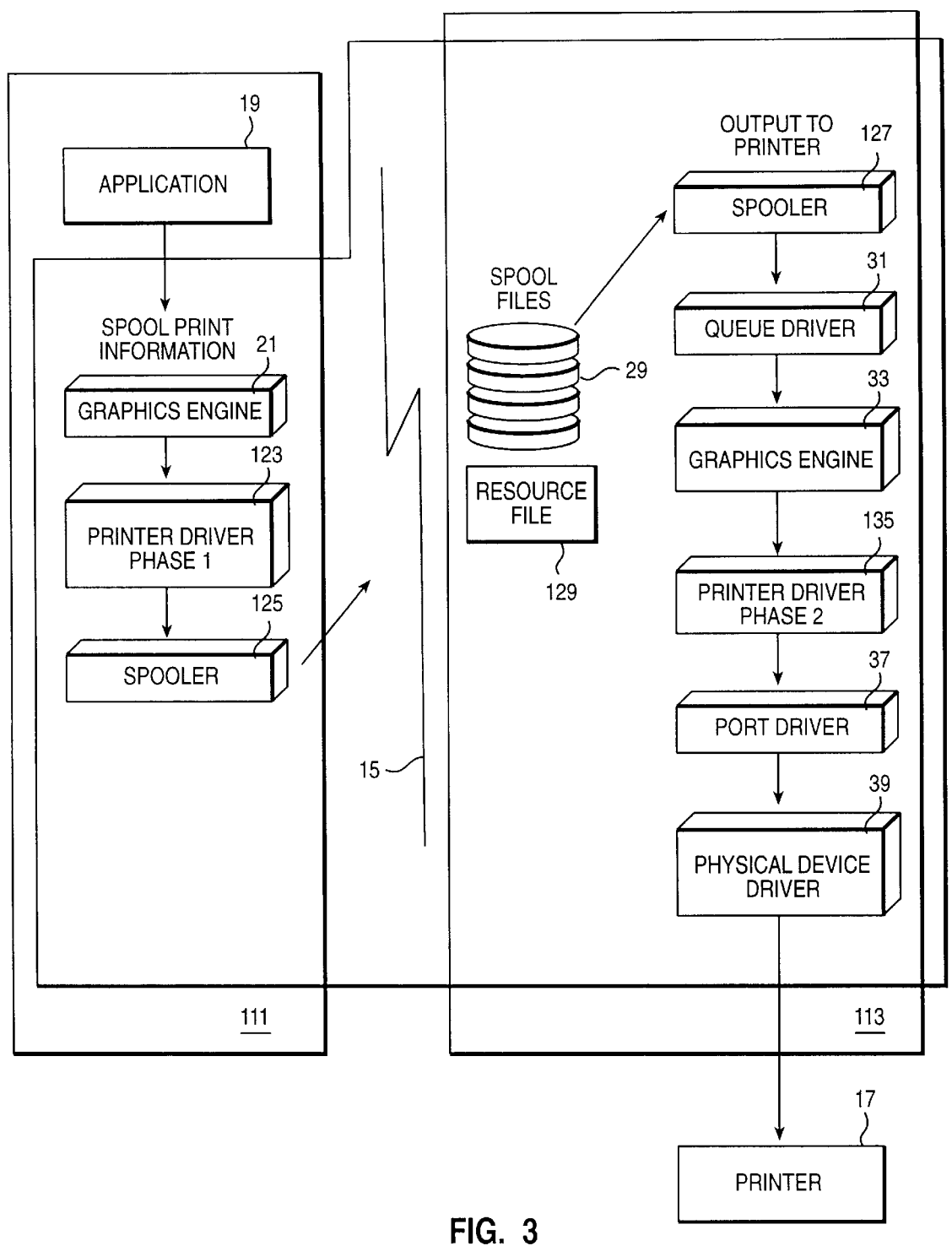
FIG. 3 is an architectural diagram of a distributed printing system configured according to the present invention.

One possible architecture enabling use of the present invention is shown in FIG. 3. The reader will notice that the figure is very similar to FIG. 1. Where the numbers are the same, the components are essentially unmodified. In the distributed case, as is shown, the printer drivers 123 and spooler 125 are modified at the client machine 111 to provide the resource accounting information 129 along with the spool file 29. At the printer server 113, the spooler 127 and the printer driver 135 are modified to recognize the resource accounting information and use it to optimize the use of printer resources in the print job. In the standalone client machine, similar modifications are made to the spooler and printer driver. However, one skilled in the art would recognize that the functionality provided by the present invention could be provided in a number of different architectures, such as adding the resource initialization module, resource accounting module and resource manager module as modules outside the print driver and spooler.

Figure 4:
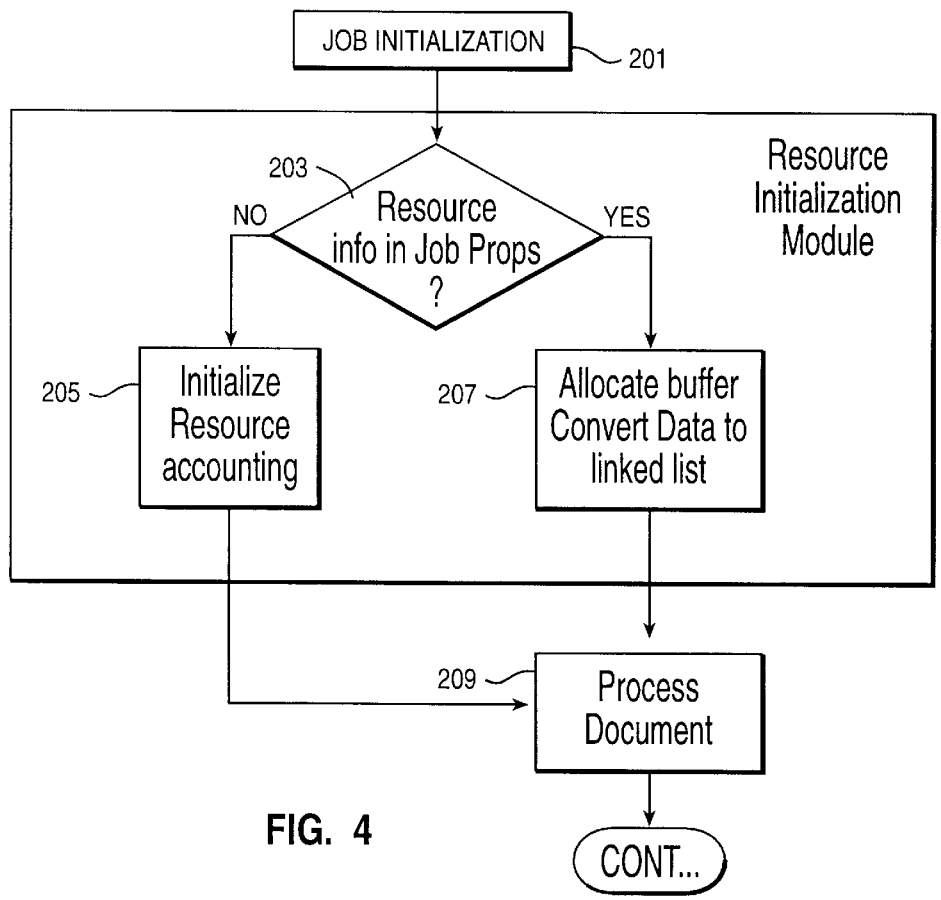
FIG. 4 is a flow diagram of the process of job initialization according to the present invention.

As shown in FIG. 4, the process for initializing a print job begins with the submission 201 of a print request from an application and the translation of the graphics APIs in the application request to the printer driver interface by the graphics engine. When the print job is started in the printer driver, the Resource Initialization Module is called. The module will first look for any resources in the job properties data, step 203. If there are no properties listed, in step 205, the module will initialize the system to start recording resources. This is the case when the print job first enters the system. If there is resource data attached to the job information, in step 207, the module will convert it from an external format to an internal format which is more efficient. An external format is a table with offsets which has slower access, but is portable. An internal format is a linked list with pointers which allows faster access, but is not portable due to its pointers. Existing resource data would include the form name used for the print job and other print options selected for the print job. In step 209, the document is processed to create the spool file and the resource accounting information. This step is detailed further in FIG. 5 and discussed below.

Figure 5:
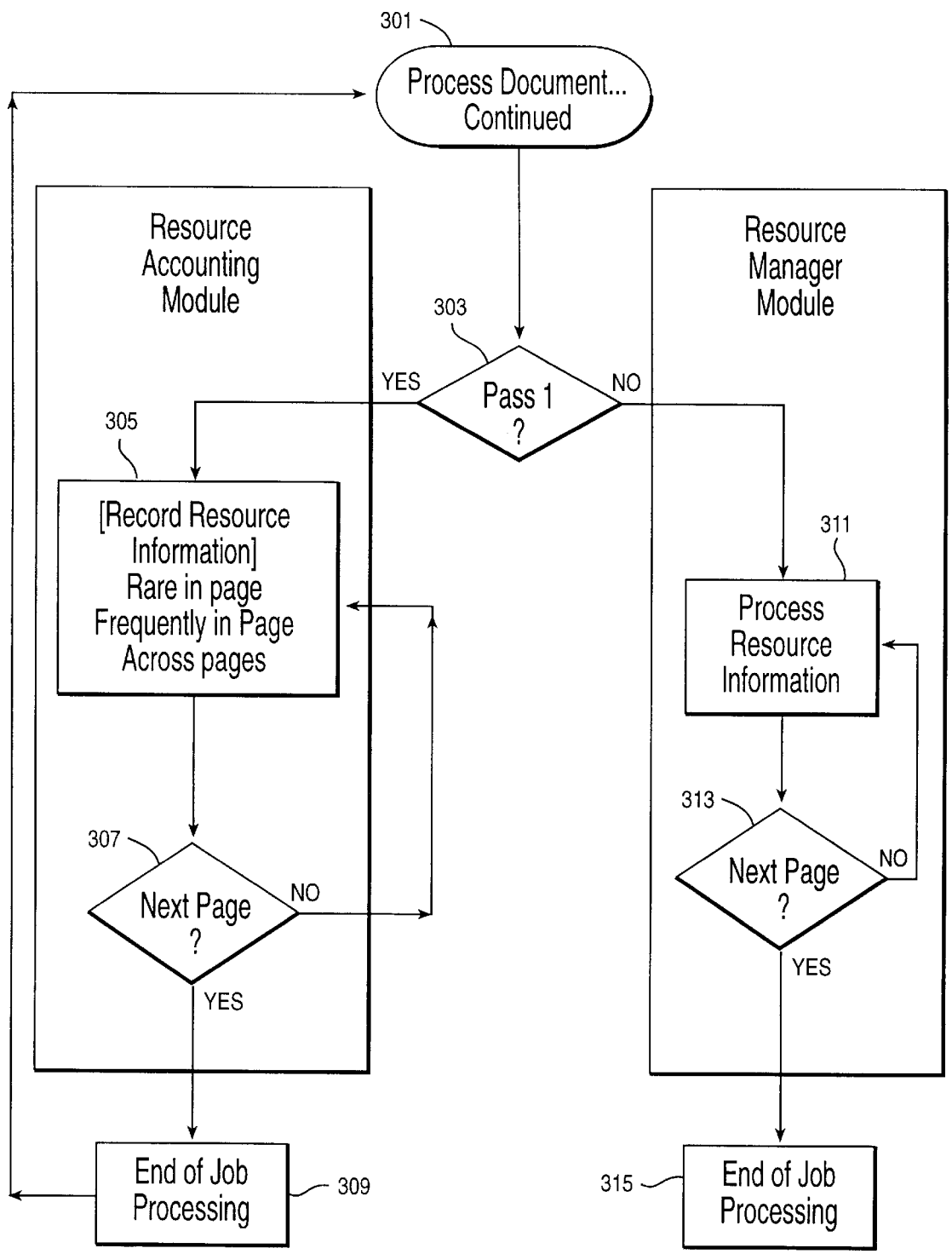
FIG. 5 is a flow diagram of the process for creating the spool file and accounting data.

In FIG. 5, the processing of a document to create the resource accounting information is shown. In step 301, the print job is received from the job initialization process for creating the resource accounting data. The test in step 303 determines whether it is the first pass, through the document. If it is the first pass, in step 305, the resource information is logged in addition to the creation of the spool file or intermediate data. Each time a function uses a resource that is a candidate for management, e.g., downloadable fonts, color table, patterns, it calls the Resource Accounting Module to log the use in the print job. Information such as what page(s), how many pages, if it is used many times, are logged with the function. At the end of each page, the Resource Accounting Module is called to review the resource use within the page. In certain situations, it might choose to change the resource use. For example, if a font is used multiple times in different save levels, it might promote the introduction of the font to the top of page.

Saved device context is a way of taking a "picture" of the printer device state. The printer state can be restored from this picture, however, any recent changes are lost. For example, if a font is downloaded to a printer and the device context/printer state is reset or restored, the font is lost. Thus, it is best to download the font before the save "picture" is taken, so the font is there upon the restoral of the printer state. A test, step 307, determines whether there are more pages to be processed. If so, the process continues step 305 with the next page. If not, end of job processing occurs in step 309 which is described in greater detail with reference to FIG. 6 below.

In a client server environment, the first pass described above takes place on the client machine and the second pass described below takes place on the server machine. In a standalone environment, both passes take place on the same machine. In the preferred embodiment, the spooler and printer driver code is essentially identical on both server and client. Flags are set in the print job or accounting file to cause the print driver and spooler to the correct process.

At the conclusion of the first pass, the process returns to step 303 which passes the print job and the logged resource information to the resource accounting module. In pass two, the creation of the printer specific data is performed using the accounting information. The Resource Manager Module reviews the accounting file to determine the use of each print resource throughout the print job. At the beginning of each page, before any memory "snapshots" are taken, the Resource Manager Module is first called to send any resources to the printer via the printer data stream that are used for multiple pages which start with the current page, step 311. A memory snapshot is taken, the Resource Manager Module is then called again to send any resources to the printer that are used throughout the page in different save levels. If the resource is used only on one page, it will be sent when needed. Each page is reviewed in turn, step 313. If a MultiPage resource was downloaded, but is not used on any subsequent pages, the resource is removed. After the last page, end of job processing occurs, step 315, which is discussed below in reference to FIG. 6.

Printer specific data is the content that is specific for certain types of printers. Examples of printer-specific formats are PostScript, PCL5, PCL6 and PPDS. A metafile is a special format that only the graphics system and printer drivers know about. Most printers do not know how to process a metafile, which is why the printer driver generates printer specific data to be used by the printer.

Figure 6:
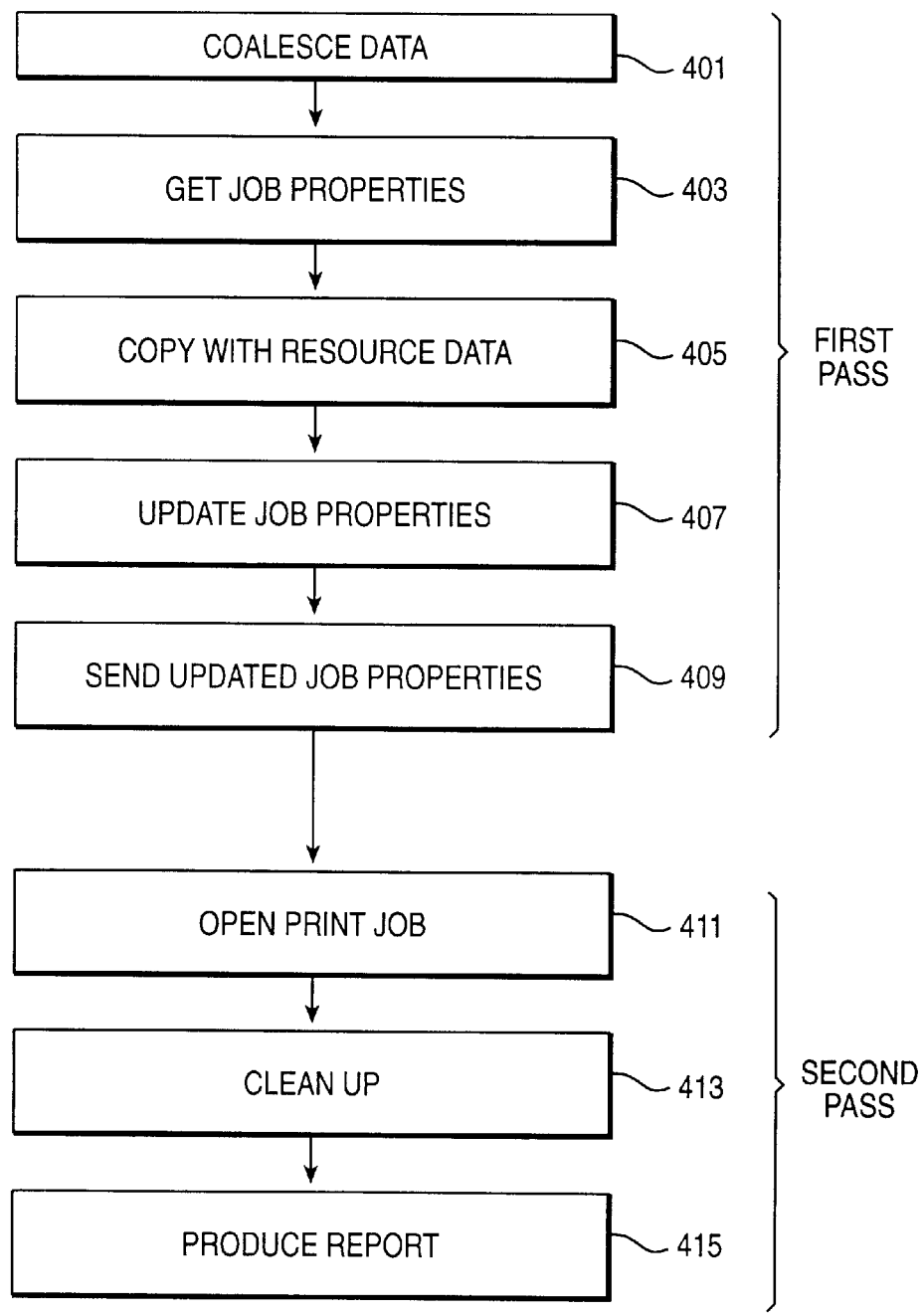
FIG. 6 is a flow diagram for the conclusion of the process of creating the spool file and accounting data.

In FIG. 6, the end of job processing for the creation of the spool file and the creation of printer specific data are shown. For pass one, in which the spool file or intermediate data was created, in step 401 at the end of print job, the resource information is coalesced into a single print buffer. Next, in step 403, the system is queried for a copy of the Job Properties. In step 405, a new copy is made with the old properties and the resource information appended to it. In step 407, the proper fields are updated to create the new Job Properties to reflect any changes in resource utilization. The new Job Properties block is given back to the system to replace the current one, step 409.

When the print job is opened in pass two, step 411, the RMM will look for this resource information. At the end of a creation of the printer specific data, the Resource Accounting Module will clean up by freeing any memory allocated for print job resource tracking, step 413. Optionally, in step 415, the resource accounting module will produce a report of resource use.

In one preferred embodiment of the invention, the report is in the form of:

%%DocumentSuppliedResources:
%%+type name
%%+type name
where type is resource type (font, pattern, . . . ) and name is the resource name.
Example:
%%DocumentSuppliedResources:
%%+font Times New Roman
%%+font Times New Roman Bold
%%+font Times New Roman Italic
The report can be used by a document processor to know what resources are needed to optimize scheduling of job.

The above flow diagram provides that most of the actual optimization of the printer stream occurs at the printer driver of the reciever of the print job. The inventors believe this to be the preferred embodiment as the local printer driver will be best be equipped to know the conditions, i.e. memory, at the requested printer. However, the optimization can occur at the creation of the accounting and spool files by the modification of print resource usage in either or both files from that which was originally proposed by the application.

A sample three page document in FIG. 7 illustrates the use of the invention on a print job. For the purposes of illustration, the document is short and relatively simple. Those skilled in the art would appreciate that much longer and more complicated documents would benefit most from the invention.

There are several categories of font usage illustrated. Other categories of font usage are possible. In a MultiPage font use, e.g., Font A, the print resource is used across multiple pages. It should be sent to the printer before or at the very beginning of the first page it is used. For example, a font F1 which is used on page 5, 7, and 8 should be sent after page 4 and before page 5. In a TopOfPage use, e.g., Font B, the print resource is confined to one page, but due to the fact of how it is used, it should be sent within the page but before any page operations. For example, font F2 is used within a saveDC/RestoreDC pair in several places of the page. It would be sent at the top of page before any saves so it is not lost by a potential restore.

In a SinglePage use, e.g., Font C, the resource is used only on that page and there are no particular reasons that would make it a TopOfPage. The resource is sent when it is first used. In a SingleLine use, e.g., Font D, the resource is only used for one line. In this type of use, the driver might choose to download only the characters needed for the line. In a SingleChar use, e.g., Font E, the resource is only used once. In this type of use, the print driver might not even download the font and let the print engine stroke the character.

There are 5 different fonts used in the print sample diagram: Font A, Font B, Font C, Font D and Font E. Each time, a font is called, a notation, e.g., Font A, is made in the figure. The small "x"s represent text strings. Using the invention, the final classification for each of the fonts is:

Font A=MultiPage
Font B=TopOfPage
Font C=SinglePage
Font D=SingleLine
Font E=SingleChar The application requesting the document be printed simply makes graphics calls, e.g., SetFont and DrawString, which would normally be translated into the metafile and printer specific equivalents. Because the invention tracks the use of all the print resources on each of the pages, the Resource Accounting Module will classify the fonts used and process the print resources according to the classification.

After the first page is sent by the application, the font classification is:
Font A=SinglePage
Font B=TopOfPage
Font C=SinglePage After the second page is sent by the application, the font classification is:
Font A=is promoted to MultiPage
Fonts B and C remain same
Font D=SingleLine After the third page is sent by the application, the font classification is:
Fonts A, B, C and D remain same
Font E=SingleChar As is mentioned above, the information gathered by the invention on print resource usage can not only be used for downloading or otherwise providing the print resource in the most efficient way, but can also be used to remove resources if the print memory is constrained. For example, suppose that the print buffer could hold only three fonts in the example shown in FIG. 7. When it comes time to issue commands for providing Font D, the print driver knows that neither Font B nor Font C is used in the document after page 1 so that either could be removed without necessitating a future download of the font.

Although the example above is for a set of font resources, the reader will appreciate that the same principles are involved for other print resources such as color palettes.

Figure 8:
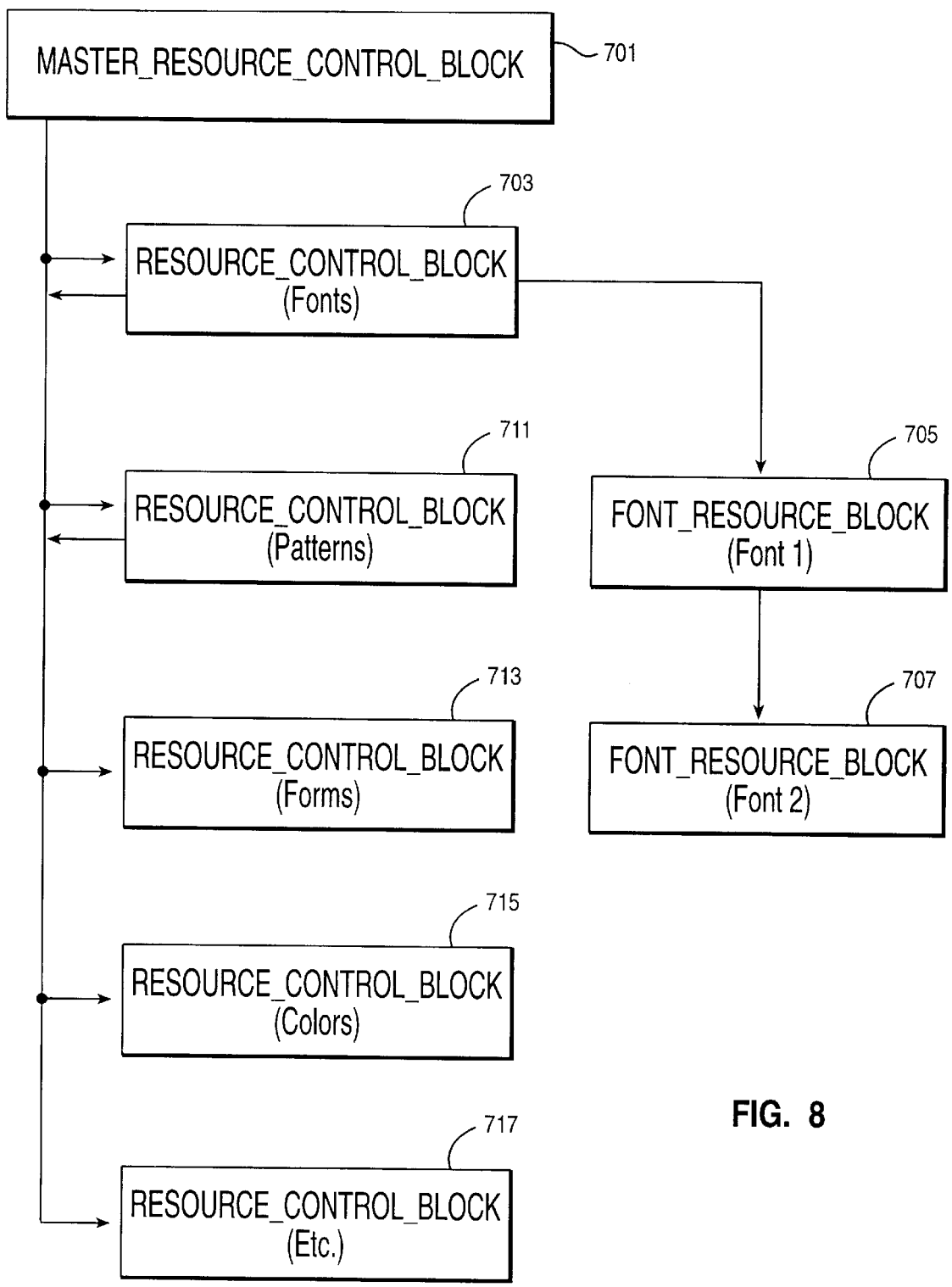
FIG. 8 is a diagram of a data structure used in a preferred embodiment of the invention.

In FIG. 8, a data structure which can be used to store Resource Accounting Data is shown. In a typical print system, print resources are stored in a block type storage system. Each component is a block with a common header and additional fields as needed. The header has a type which uniquely identifies it, a size which is the whole size of the block, and pointer to the next block of same type.

The resources are stored as linked lists when created. The Master Resource Control Block 701 is stored in the CNF-DATA (Job Props). If the count is 0 then there are no resources. Each resource has a Resource Control Block which contains a common header, count of resources of that type and a pointer to the chain. For example in FIG. 8, the master resource control block 701 points to the resource control block 703 for fonts. The font resource control block 703 points to a font resource block 705 for a first font which in turn points to a font resource block 707. The font resource control block 703 also contains a pointer to a pattern resource control block 711. The pattern resource control block 711 can in turn point to resource blocks for individual patterns (not shown). The pattern resource control block 711 contains a pointer to a form resource control block 713. The form resource control block 713 contains a pointer to the colors resource control block 715. As shown generally, the colors resource control block 715 can contain a pointer to another resource control block 717 which contains parameters for other printer resources.

The block types portrayed on the figure are given in the table below:

TABLE ONE

| /* Block types */ | |
|---|---|
| #define NULL_BLOCK //NULL | 0x4C4C554E |
| #define MASTER_RESOURCE_CONTROL_BLOCK //MRCB | 0x4243524D |
| #define FONT_CONTROL_BLOCK //FCB_ | 0x5F424346 |
| #define FONT_RESOURCE_BLOCK //FRB_ | 0x5F425246 |

Note that pointers are not explicitly defined in the actual data structures for two reasons. First, the resource data is part of job properties which goes between processes or systems via network. Second, they can change size between operating systems. For example, the conversion between 32 bit and 64 bit operating systems can cause alignment problems. The pointers must be converted to offsets when given to the spooler. They can be converted batik to pointers when processed by the printer driver.

The resource headers used for each block contain the block type, the size of the block, an optional offset field for split records as well as a pointer to the next block of the same type. A sample format is given in the table below:

TABLE TWO

```
typedef struct _RESHEADER
{
    ULONG   ulType;      // Block type
    LONG    lSize;       // Size of block
    ULONG   ulpNext;     // Pointer to next of same type
} RESHEADER, *PRESHEADER;
```

Sample data structures for the various resource control blocks are given in the table below.

TABLE THREE

```
typedef struct __RESOURCECONTROLBLOCK
{
    RESHEADER       header;
    LONG            lCount;             // How many resource blocks
    ULONG           ulpResource;        // Pointer to resource blocks
} RESOURCECONTROLBLOCK, *PRESOURCECONTROLBLOCK;
typedef struct __MASTERRESOURCECONTROLBLOCK
{
    RESHEADER       header;
    ULONG           ulVersion;
        #define         V1_0 0x00010000         // Note - update this where ref
    LONG            lCount;             // How many control blocks
    LONG            lTotalSize;         // Total size of all resource material needed only
                                        // when stored out of memory - don't include MRCB
                                        // it's in CNFDATA
    ULONG           ulFlags;            // Flags for resources
        #define         RESOURCE_DATA_SET       0x00000001
        #define         RESOURCE_DO_NOT_FREE    0x00000002
        #define         RESOURCE_FREE_BLOCKS    0x00000004
        #define         RESOURCE_FREE_BUF       0x00000008
    ULONG           ulPRCB;     // Ptr/off set to Resource Control Blocks
} MASTERRESOURCECONTROLBLOCK, * PMASTERRESOURCECONTROLBLOCK;
typedef struct __FONTRESOURCEBLOCK
{
    RESHEADER       header;         //FONT_RESOURCE_BLOCK
    LONG            ulUsage;        // How resource is used. It can be a single character
                                    // in the file. Single line is resource used on single
                                    // line of text. Single page means more than one line
                                    // but only on single page. Resources can be loaded
                                    // within the page save state. Top of page means the
                                    // resource must downloaded at top of page instead of
                                    // where it used. Multi page means resource is used
                                    // across multiple pages and needs be loaded outside
                                    // the page state.
        #define         SINGLE_CHAR             0x00000001
        #define         SINGLE_LINE             0x00000002
        #define         SINGLE_PAGE             0x00000004
        #define         TOP_OF_PAGE             0x00000008
        #define         MULTI_PAGE              0x00000010
    LONG            lStartPage;             // First page the resource is used on
    LONG            lFontType;
        #define         DEVICEFONT      1       // Printer resident device font
        #define         DOWNLOAD        2       // The font must be downloaded
        #define         ENGINEFONT      3       // The engine will stroke font
    ULONG           ulFlags;
        #define         FONT_LOADED             0x00000001 // Font has been downloaded
        #define         IN_SAVE_STATE           0x00000002 // Font used in some savedDC
//#define         FONT_NAME_SIZE 32
    CHAR            achFontName [ FACESIZE + 1 ];
} FONTRESOURCEBLOCK * PFONTRESOURCEBLOCK;
```

The SplSetJob function is used to change the instructions for a print job. In the present invention, it is used to reset job properties from those originally given by the application to the more efficient ones chosen by the resource accounting and manager modules. The parameters of this function are given in the table below.

For sake of a complete specification, a description of a general purpose computer on which the invention is implemented follows. The invention may be run on a variety of computers in a collection of computers under a number of different operating systems. The computer could be, for example, a hand held computing device, a personal

TABLE FOUR

```
PSZ      pszComputerName;   /* Name of computer where job is to be modified. */
PSZ      pszQueueName;      /* Queue Name. */
ULONG    ulJob;             /* Job identification number. */
ULONG    ulLevel;           /* Level of detail required. */
PVOID    pBuf;              /* Buffer. */
ULONG    cbBuf;             /* Size, in bytes, of Buffer. */
ULONG    ulParmNum;         /* Parameter number. */
SPLERR   rc;                /* Return code. */
``` rc = SplSetJob(pszComputerName, pszQueueName, ulJob, ulLevel, pBuf, cbBuf, ulParmNum);

computer, a mini computer or a mainframe computer. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system. Other computers and operating systems are known.

Figure 9:
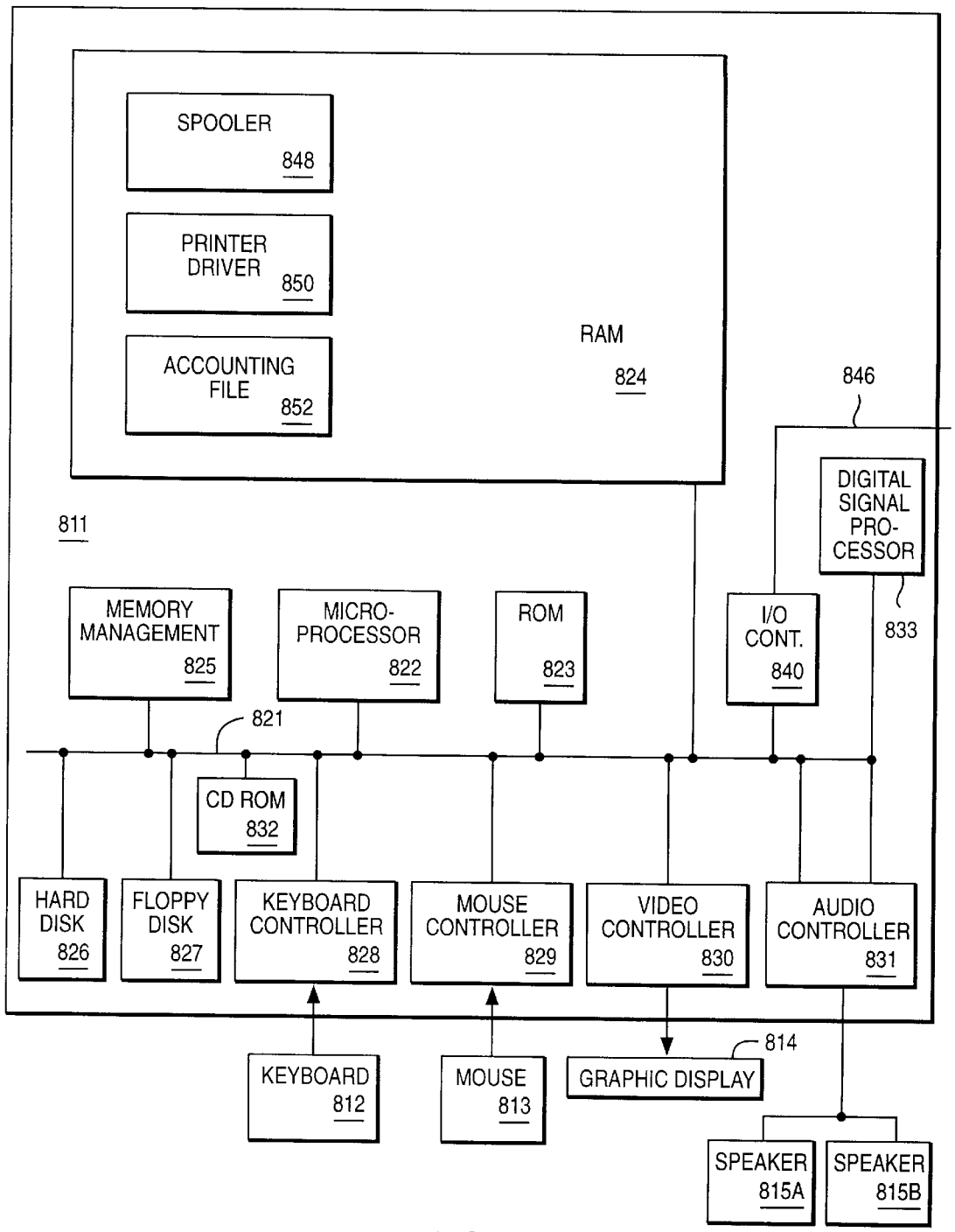
FIG. 9 shows a general purpose computer configured according to the present invention.

In FIG. 9, a computer 810, comprising a system unit 811, a keyboard 812, a mouse 813 and a display 814 are depicted in block diagram form. The system unit 811 includes a system bus or plurality of system buses 821 to which various components are coupled and by which communication between the various components is accomplished. The microprocessor 822 is connected to the system bus 821 and is supported by read only memory (ROM) 823 and random access memory (RAM) 824 also connected to system bus 821. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 823 contains among other code the Basic Input-Output system (BIOS) which controls basic hardware operations such as the interaction of the processor and the disk drives and the keyboard. The RAM 824 is the main memory into which the operating system and application programs are loaded. The memory management chip 825 is connected to the system bus 821 and controls direct memory access operations including, passing data between the RAM 824 and hard disk drive 826 and floppy disk drive 827. The CD-ROM 832 also coupled to the system bus 821 is used to store a large amount of data, e.g., a multimedia program or presentation.

Also connected to this system bus 821 are various I/O controllers: The keyboard controller 828, the mouse controller 829, the video controller 830, and the audio controller 831. As might be expected, the keyboard controller 828 provides the hardware interface for the keyboard 812, the mouse controller 829 provides the hardware interface for mouse 813, the video controller 830 is the hardware interface for the display 814, and the audio controller 831 is the hardware interface for the speakers 815. An I/O controller 840 such as a Token Ring Adapter enables communication over a network 846 to other similarly configured data processing systems.

As described above, one of the preferred implementations of the invention is as sets of instructions 848–852 resident in the random access memory 824 of one or more computer systems configured generally as described above. Until required by the computer system, the set of instructions may be stored in another computer readable memory, for example, in the hard disk drive 826, or in a removable memory such as an optical disk for eventual use in the CD-ROM 832 or in a floppy disk for eventual use in the floppy disk drive 827. Further, the set of instructions can be stored in the memory of another computer and transmitted in a transmission medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to preform the described invention. Therefore, changes in form and detail may be made therein without departing from the spirit and scope of the invention as set forth in the accompanying claims.

We claim:

1. A method for preparing a print job for printing comprising the steps of:

during creation of a spool file, logging data on print resource usage in a print job in an accounting file;

modifying the print resource usage data in the accounting file to optimize print resource usage;

sending the spool file and the accounting file to a printer driver;

using the accounting file by the printer driver to create a print data stream wherein the using step further comprises:

determining that a maximum number of print resources will have been downloaded at a first point in a print data stream to be sent to the printer;

determining that a new print resource is required at a second point after the first point in the print data stream;

determining a least used print resource after the second point by reference to the accounting file; and including commands to remove the least used print resource and install the new print resource at the second point.

2. The method as recited in claim 1 further comprising the step of sending the print data stream to the printer.

3. The method as recited in claim 1 wherein the using step further comprises:

referring to the accounting file for a print resource which is used in multiple sections of the print job;

determining a first point in a print data stream at which the print resource is used; and including commands to install the print resource by the first point, wherein no commands are included which would remove the print resource prior to use of the print resource in the multiple sections.

4. A method for preparing a print job for printing comprising the steps of:

during creation of a spool file, logging data on print resource usage in a print job in an accounting file;

modifying the print resource usage data in the accounting file to optimize print resource usage;

sending the spool file and the accounting file to a printer driver;

using the accounting file by the printer driver to create a print data stream wherein the using step further comprises:

determining that a download of a print resource is less efficient than an alternate means of providing the print resource based on use of the print resource in the accounting file;

including commands in the print data stream to provide the print resource by the alternate means.

5. The method as recited in claim 1, wherein the print resource is a font.

6. A method for preparing a print job for printing comprising the steps of:

receiving a spool file containing a print job and an accounting file containing print resource data in the print job by a printer driver;

using the accounting file by the printer driver to improve print resource usage in the print job; and sending a print data stream to a printer wherein the using step further comprises:

determining that a maximum number of print resources will have been downloaded at a first point in the optimized print data stream to be sent to the printer;

determining that a new print resource is required at a second point after the first point in the optimized print data stream;

determining a least used print resource after the second point by reference to the accounting file; and including commands to remove the least used print resource and install the new print resource at the second point.

7. The method as recited in claim 6 wherein the using step further comprises:

referring to the accounting file for a print resource which is used in multiple sections of the print job;

determining a first point in the optimized print data stream at which the print resource is used; and including commands to install the print resource by the first point, wherein no commands are included which would remove the print resource prior to use of the print resource in the multiple sections.

8. A method for preparing a print job for printing comprising the steps of:

receiving a spool file containing a print job and an accounting file containing print resource data in the print job by a printer driver;

using the accounting file by the printer driver to improve print resource usage in the print job; and sending a print data stream to a printer wherein the using step further comprises:

determining that a download of a print resource is less efficient than an alternate means of providing the print resource based on use of the print resource in the accounting file;

including commands in the optimized print data stream to provide the print resource by the alternate means.

9. A method for preparing a print job for printing comprising the steps of;

logging data on print resource usage in a print job in an accounting file;

modifying the print resource usage data in the accounting file to optimize print resource usage;

sending the print job and the accounting file to a printer driver; and using the accounting file by the printer driver to modify the print resource usage called for in the print job wherein the using step further comprises:

determining that a maximum number of print resources will have been downloaded at a first point in the optimized print data stream to be sent to the printer;

determining that a new print resource is required at a second point after the first point in the optimized print data stream;

determining a least used print resource after the second point by reference to the accounting file; and including commands to remove the least used print resource and install the new print resource at the second point.

10. The method as recited in claim 9 wherein the print job is a metadata file produced by a spooler in a client system and the printer driver is resident in a server system.

11. A method for preparing a print job for printing comprising the steps of:

logging data on print resource usage in a print job as originally called by an application; and using the logged data by the printer driver to create a device specific print stream for a printer, wherein the print resource usage called by the application is modified to improve print resource usage by the printer wherein the using step further comprises:

determining that a download of a print resource is less efficient than an alternate means of providing the print resource based on use of the print resource in the accounting file;

including commands in the optimized print data stream to provide the print resource by the alternate means.

12. A system including processor and memory for preparing a print job for printing comprising:

a print resource manager for logging data on print resource usage in a print job in an accounting file;

means for sending the print job and the accounting file to a printer driver, means for determining that a maximum number of print resources will have been downloaded at a first point in a print data stream to be sent to the printer;

means for determining that a new print resource is required at a second point after the first point in the print data stream;

means for determining a least used print resource after the second point by reference to the accounting file; and means for including commands to remove the least used print resource and install the new print resource at the second point; and a printer driver which uses the accounting file to modify the print resource usage called for in the print job.

13. The system as recited in claim 12 further comprising:

a client system in which an application, an operating system, a spooler and a printer driver are resident;

a server system coupled to a printer in which an operating system, a spooler and a printer driver are resident; and a network coupling the client and server system;

wherein the print job is a metadata file produced by the spooler and the printer driver in the client system and the printer driver resident in the server system modifies the print resource usage.

14. The system as recited in claim 12 further comprising:

means for referring to the accounting file for a print resource which is used in multiple sections of the print job;

means for determining a first point in a print data stream at which the print resource is used; and means for including commands to install the print resource by the first point, wherein no commands are included which would remove the print resource prior to use of the print resource in the multiple sections.

15. A system including processor and memory for preparing a print job tor printing comprising:

a print resource manager for logging data on print resource usage in a print job in an accounting file;

means for sending the print job and the accounting file to a printer driver;

means for determining that a download of a print resource is less efficient than an alternate means of providing the print resource based on use of the print resource in the accounting file; and means for including commands in the print data stream to provide the print resource by the alternate means.

16. A computer program product in a computer readable medium for preparing a print job for printing comprising:

spooling means for receiving a spool file containing a print job and an accounting file containing print resource data in the print job;

means for using the accounting file to improve print resource usage in the print job, wherein the means for using includes:

means for determining that a maximum number of print resources will have been downloaded at a first point in a print data stream to be sent to the printer;

means for determining that a new print resource is required at a second point after the first point in the print data stream;

means for determining a least used print resource after the second point io reference to the accounting file; and means for including commands to remove the least used print resource and install the new print resource at the second point; and means for sending a print data stream to a printer containing the improved print resource usage.

17. The product in claim 16 wherein the spooler and the printer driver also include instructions for generating the accounting file and the print job from graphics calls made by an application.

18. The product as recited in claim 16 further comprising:

means for referring to the accounting file for a print resource which is used in multiple sections of the print job;

means for determining a first point in a print data stream at which the print resource is used; and means for including commands to install the print resource by the first point, wherein no commands are included which would remove the print resource prior to use of the print resource in the multiple sections.

19. A computer program product in a computer readable medium for preparing a print job for printing comprising:

spooling-means for receiving a spool file containing a print job and an accounting file containing print resource data in the print job;

means for using the accounting file to improve print resource usage in the print job;

means for determining that a download of a print resource is less efficient than an alternate means of providing the print resource based on use of the print resource in the accounting file; and means for including commands in the print data stream to provide the print resource by the alternate means.

20. The product as recited in claim 16 wherein the accounting files is an in-memory data structure.

* * * * *

UNITED STATES PATENT AND TRADEMARK OFFICE
CERTIFICATE OF CORRECTION

PATENT NO : 5,993,088
DATED : November 30, 1999
INVENTOR(S): Nogay et al.

It is certified that error appears in the above-identified patent and that said Letters Patent is hereby corrected as shown below:

In the Claims:

Col. 15, line 35, delete "io" and insert therefor --by--.

Col. 16, line 34, delete "files" and insert therefor --file--..

Signed and Sealed this

Seventh Day of November, 2000

Attest:

Q. TODD DICKINSON

*Attesting Officer*        *Director of Patents and Trademarks*